United States Patent
Oroskar et al.

(10) Patent No.: US 11,109,271 B1
(45) Date of Patent: Aug. 31, 2021

(54) SELECTION OF PRIMARY CARRIER BASED ON CONTROL CHANNEL LOAD LEVELS

(71) Applicant: Sprint Spectrum LP, Overland Park, KS (US)

(72) Inventors: Siddharth Oroskar, Overland Park, KS (US); Jasinder Singh, Olathe, KS (US)

(73) Assignee: T-Mobile Innovations LLC, Overland Park, KS (US)

( * ) Notice: Subject to any disclaimer, the term of this patent is extended or adjusted under 35 U.S.C. 154(b) by 176 days.

(21) Appl. No.: 15/627,854

(22) Filed: Jun. 20, 2017

(51) Int. Cl.
| | |
|---|---|
| *H04W 28/08* | (2009.01) |
| *H04W 24/10* | (2009.01) |
| *H04L 5/14* | (2006.01) |
| *H04W 72/04* | (2009.01) |
| *H04W 76/15* | (2018.01) |
| *H04W 24/08* | (2009.01) |
| *H04B 7/155* | (2006.01) |

(52) U.S. Cl.
CPC ............. *H04W 28/08* (2013.01); *H04L 5/14* (2013.01); *H04W 24/10* (2013.01); *H04W 72/044* (2013.01); *H04W 72/0406* (2013.01); *H04W 76/15* (2018.02); *H04B 7/155* (2013.01); *H04W 24/08* (2013.01)

(58) Field of Classification Search
CPC . H04W 28/08; H04W 76/15; H04W 72/0406; H04W 24/10; H04W 72/044; H04W 24/08; H04L 5/14; H04B 7/155
See application file for complete search history.

(56) References Cited

U.S. PATENT DOCUMENTS

| | | | |
|---|---|---|---|
| 9,083,517 B2 | 7/2015 | Chen et al. | |
| 9,480,052 B2 | 10/2016 | Yin et al. | |
| 9,655,127 B1 * | 5/2017 | Srinivas | H04W 72/0486 |
| 10,064,166 B1 * | 8/2018 | Liu | H04W 28/0205 |
| 2003/0224730 A1 * | 12/2003 | Muszynski | H04W 36/22 455/62 |
| 2011/0201367 A1 * | 8/2011 | Aminaka | H04W 72/02 455/501 |
| 2012/0087257 A1 * | 4/2012 | Larsson | H04W 36/0072 370/252 |
| 2013/0012249 A1 * | 1/2013 | Centonza | H04W 72/0426 455/501 |
| 2013/0044654 A1 * | 2/2013 | Chen | H04L 5/0023 370/280 |
| 2013/0072202 A1 * | 3/2013 | Nakamura | H04W 28/0289 455/445 |
| 2015/0063307 A1 * | 3/2015 | Luo | H04W 36/165 370/331 |
| 2016/0119813 A1 * | 4/2016 | Sridhar | H04W 28/0268 370/229 |
| 2016/0262150 A1 * | 9/2016 | Wang | H04L 5/14 |
| 2018/0092066 A1 * | 3/2018 | Marupaduga | H04L 5/001 |

\* cited by examiner

*Primary Examiner* — Jae Y Lee
*Assistant Examiner* — Chuong M Nguyen (57) ABSTRACT

Systems, methods, and processing nodes for performing carrier aggregation in a wireless network including obtaining, at a relay access node, a control channel load level of a first carrier deployed by a donor access node, determining, at the relay access node, that the control channel load level is within an acceptable load level, and aggregating the first carrier with a second carrier deployed by the relay access node to communicate with a wireless device attached to the relay access node.

16 Claims, 10 Drawing Sheets

SELECTION OF PRIMARY CARRIER BASED ON CONTROL CHANNEL LOAD LEVELS

TECHNICAL BACKGROUND

As wireless networks evolve and grow, there are ongoing challenges in providing high-quality service to increasing numbers of wireless devices in various coverage areas of a wireless network. One approach to improving service quality and coverage is to implement relay nodes for relaying communication between a base station or donor access node, and an end-user wireless device. Combinations of wireless devices designated as relays (henceforth, "relay wireless devices") that are co-located with relay access points may be used at the edge of a coverage area of a donor access node to improve coverage and/or service, as well as in crowded areas having a high number of other wireless devices to increase the available throughput to the end-user wireless devices being relayed.

However, relay nodes may be limited in their ability to effectively service wireless devices that are attached to it, particularly if the throughput of the backhaul connection between the relay wireless device and the donor access node is limited. To adequately provide services to high-traffic wireless devices, relay nodes may be configured to implement carrier aggregation for these wireless devices. Since a relay node typically does not deploy more than one carrier, a carrier deployed by the donor access node may be aggregated with the carrier deployed by the relay node. However, even donor access node carriers may be overloaded.

OVERVIEW

Exemplary embodiments described herein include systems, methods, and processing nodes for performing carrier aggregation based on control channel load levels. An exemplary system described herein includes a first access node configured to deploy one or more carriers of a first type, a second access node communicably coupled to the first access node, the second access node being configured to deploy one or more carriers of a second type, and a processing node communicably coupled to both first and second access nodes. The processing node is configured to perform operations including identifying a wireless device attached to the second access node that can communicate via two or more aggregated carriers, instructing the first access node to transmit, to the second access node, one or more load levels of one or more control channels respectively associated with the one or more carriers of the first type, and instructing the second access node to identify a first carrier from among the one or more carriers of the first type that has a load level of its associated control channel that is below a threshold load level, aggregate the first carrier with a second carrier from among the one or more carriers of the second type, and communicate with the wireless device using the aggregated first and second carriers.

An exemplary method described herein for performing carrier aggregation in a wireless network includes obtaining, at a relay access node, a control channel load level of a first carrier deployed by a donor access node, determining, at the relay access node, that the control channel load level is within an acceptable load level, and aggregating the first carrier with a second carrier deployed by the relay access node to communicate with a wireless device attached to the relay access node.

An exemplary processing node described herein for performing carrier aggregation in a wireless network is configured to perform operations including obtaining a load information associated with a first frequency sub-band deployed by a first access node, wherein the load information indicates an availability of resources within a control channel associated with the first frequency sub-band, and transmitting the load information to a second access node in communication with the first access node, wherein the second access node aggregates the first frequency sub-band with a second frequency sub-band deployed by the second access node

DETAILED DESCRIPTION

Exemplary embodiments described herein include systems, methods, and processing nodes for performing carrier aggregation based on control channel load levels. An exemplary system described herein includes at least two access nodes that are in direct communication with each other, via a wired or wireless link. For example, the first access node may be a macrocell access node, such as an eNodeB, and the second access node may be a small cell access node, such as a relay node in wireless communication with the macrocell access node, or a home eNodeB in wired communication with the macrocell access node. For example, the relay node includes a relay wireless device coupled to a relay access point, and is configured to relay data packets between the first access node and an end-user wireless device attached to the relay access point. In such an embodiment, the first access node may be referred to as a donor access node. In other embodiments, both access nodes may be macrocell access nodes or small cell access nodes. In either case, the first access node may be configured to deploy one or more carriers of a first type, and the second access node may be configured to deploy one or more carriers of a second type. The first and second type may include different types of duplexing modes. For example, carriers of the first type may be deployed by the first access node using a frequency division duplexing (FDD) mode, and carriers of the second type may be deployed by the second access node using a time division duplexing (TDD) mode. Within an exemplary long-term evolution (LTE) system, the first type of carrier may include a FDD-LTE carrier, and the second type of carrier may include a TD-LTE carrier.

Further, exemplary systems described herein include a processing node communicably coupled to both first and second access nodes, and configured to enable carrier aggregation for a mobile device in wireless communication with the second access node based on load information associated with the first type of carrier deployed by the first access node. For example, the processing node may be configured identify a wireless device attached to the second access node and capable of communicating via two or more aggregated carriers (i.e. carrier aggregation), instruct the first access node to transmit load levels to the second access node, and instruct the second access node to enable carrier aggregation for the wireless device based on the load information. The load information can include a load level of control channels respectively associated with one or more carriers of the first type. Such load information is relevant for carrier aggregation, particularly when the carrier of the first type is the primary carrier, and the carrier of the second type is the secondary carrier, since the control channel of the carrier of the first type may be utilized to control transmissions for both aggregated carriers. For example, a control channel load level comprises an indicator of available resources as a percentage of total resources within a control channel associated with the first carrier. In either case, the first access node may be instructed to transmit the load information to the second access node via a direct connection. For example, a donor access node may transmit load information of a control channel deployed therefrom to a relay node via a wireless backhaul communication link between the donor access node and the relay node.

One or both of the first access node and the second access node may be instructed to identify a carrier that has a load level of its associated control channel (i.e. control channel load level) below a threshold load level. The second access node may be instructed to aggregate the identified carrier (of the first type deployed by the first access node) with a carrier of the second type deployed from the second access node, and communicate with the wireless device using the aggregated first and second carriers. In exemplary embodiments described herein, the first access node may be one among a plurality of macrocell access nodes communicably coupled to the second access node. Each of the plurality of macrocell access nodes is configured to deploy carriers of the first type. Thus, upon identifying a wireless device capable of carrier aggregation and attached to the second access node, each of the plurality of macrocell access nodes may be instructed to transmit load levels of control channels associated the plurality of carriers of the first type deployed therefrom. Further, a carrier with an acceptable load level of its control channel (i.e. with a control channel load level at or below a threshold load level) may be identified from among the plurality of carriers of the first type, and aggregated with the carrier deployed by the second access node. In other words, the carrier associated with a control channel having the highest available resources from among the plurality of carriers is selected as a primary carrier for the carrier aggregation.

In addition to the systems described herein, these operations may further be implemented as computer-readable instructions or methods, and processing nodes on the network for executing the instructions or methods. For example, a processing node coupled to a relay node may be configured to identify wireless devices capable of carrier aggregation attached thereto, and subsequently request load information from one or more donor access nodes. Alternatively or in addition, a processing node coupled to a donor access node may be configured to periodically transmit load information to relay access nodes attached thereto. These and other embodiments are further described herein and with reference to FIGS. 1-10.

Figure 1:
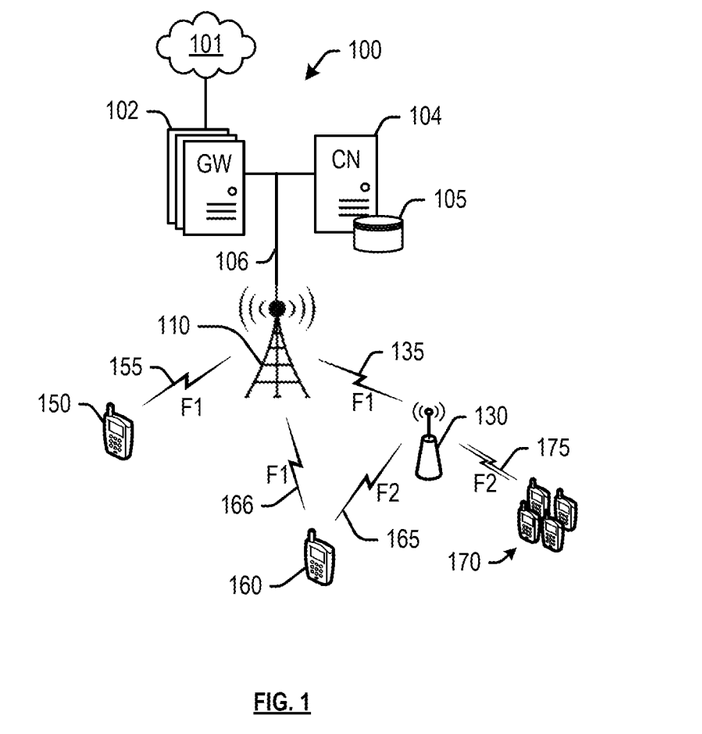
FIG. 1 depicts an exemplary system for performing carrier aggregation based on control channel load levels.

FIG. 1 depicts an exemplary system for performing carrier aggregation based on control channel load levels. System 100 comprises a communication network 101, gateway 102, controller node 104, access node 110, relay node 130, and end-user wireless devices 150, 160, and 170. In this exemplary embodiment, access node 110 may be a macrocell access node configured to deploy one or more carriers utilizing a first frequency F1. Thus, wireless device 150 is illustrated as being in direct communication with access node 110 over communication link 155 utilizing first frequency F1. Further, relay node 130 may be configured to deploy one or more carriers utilizing a second frequency F2. Thus, wireless devices 160 and 170 are illustrated as being in direct communication with relay node 130 over communication links 165 and 175, respectively, each of which utilizes second frequency F2. Further, relay node 130 may be configured to communicate with access node 110 over communication link 135 utilizing first frequency F1 (hereinafter referred to as a "wireless backhaul link"), and is configured to relay data packets between wireless devices 160, 170 and access node 110. Consequently, access node 110 may be termed a "donor" access node. Thus, wireless devices 160, 170 may access network services using the combination of relay node 130 and wireless backhaul link 135 rather than directly connecting to (and potentially overloading) donor access node 110, which may be serving numerous other devices (such as wireless device 150, among others). Moreover, wireless devices among wireless devices 160, 170 that are outside a coverage area of donor access node 110 may access network services from donor access node 110 by virtue of being connected to relay node 130. Frequencies F1 and F2 may be any frequency band or sub-band. Furthermore, carriers on frequencies F1 and F2 may be deployed using different types of multiplexing modes. For example, a carrier deployed by access node 110 may utilize an FDD-LTE mode, and a carrier deployed by relay node 130 may utilize a TD-LTE mode. In other embodiments, any other combination of macrocell access nodes, relay access nodes, and carriers deployed therefrom may be evident to those having ordinary skill in the art in light of this disclosure.

Further, as described herein, a processing node communicatively coupled to one or both of access node 110 and relay node 130 may be configured to perform carrier aggregation for wireless device 160 based on load levels of control channels of carriers deployed by donor access node 110. Operations described herein include determining that wireless device 160 is capable of communicating via two or more aggregated carriers (i.e. carrier aggregation), instructing donor access node 110 to transmit control channel load levels to relay node 130, and instruct relay node 130 to enable carrier aggregation for wireless device 160 based on the load information. The control channel load information can include a load level of control channels respectively associated with one or more carriers of a first type. For example, the load information can include a load level or percentage usage of a control channel of the carrier utilizing frequency F1 and multiplexed using FDD-LTE. Since the carrier deployed by donor access node 110 may be set as a primary carrier for the carrier aggregation of wireless device 160, the load information is relevant in determining which carrier to utilize. In this case, donor access node 110 may transmit load information of a control channel deployed therefrom to relay node 130 via wireless backhaul link 135.

Moreover, one or both of donor access node 110 and relay node 130 may be instructed to identify a carrier that has a load level of its associated control channel (i.e. control channel load level) below a threshold load level. Upon identifying the carrier associated with the control channel having the highest resources (i.e. lowest load level), relay node 130 may be instructed to aggregate the identified carrier with the carrier deployed therefrom, and communicate with wireless device 160 using the aggregated first and second carriers. In other words, wireless device 160 is instructed (by relay node 130, or by any other network node) to communicate using a combination of aggregated communication links 165 and 166. Further, donor access node 110 may be configured to periodically transmit load information to relay node 130 (and other relay nodes attached thereto), enabling relay node 130 to determine which carrier to aggregate with the carrier deployed therefrom.

Access node 110 can be any network node configured to provide communication between wireless devices 150, 160, 170 and communication network 101, including standard access nodes such as a macro-cell access node, base transceiver station, a radio base station, an eNodeB device, an enhanced eNodeB device, or the like. In an exemplary embodiment, a macro-cell access node can have a coverage area in the range of approximately five kilometers to thirty-five kilometers and an output power in the tens of watts. Further relay node 130 may comprise any combination of a relay wireless device capable of communicating over wireless backhaul 135, and a small-cell access node capable of deploying a wireless air interface for wireless devices 160, 170. Relay node 130 may comprise any short range, low power, small-cell access nodes such as a microcell access node, a picocell access node, a femtocell access node, or a home eNodeB device.

Access node 110 and relay node 130 can comprise a processor and associated circuitry to execute or direct the execution of computer-readable instructions to perform operations such as those further described herein. Briefly, access node 110 and relay node 130 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Further, access node 110 and relay node 130 can receive instructions and other input at a user interface. Access node 110 communicates with gateway node 102 and controller node 104 via communication links 106, 107. Access node 110 and relay node 130 may communicate with each other, and other access nodes (not shown), using a wireless link or a wired link such as an X2 link. Components of exemplary access nodes 110 and relay nodes 130 are further described with reference to FIGS. 2-4.

Wireless devices 150, 160, 170 may be any device, system, combination of devices, or other such communication platform capable of communicating wirelessly with access node 110 and/or relay node 130 using one or more frequency bands deployed therefrom. Each of wireless devices 150, 160, 170 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can send and receive audio or data. Other types of communication platforms are possible.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless devices 150, 160, 170. Wireless network protocols can comprise MBMS, code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication links 106, 107 can use various communication media, such as air, space, metal, optical fiber, or some other signal propagation path—including combinations thereof. Communication links 106, 107 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Communication links 106, 107 may include Si communication links. Other wireless protocols can also be used. Communication links 106, 107 can be a direct link or might include various equipment, intermediate components, systems, and networks. Communication links 106, 107 may comprise many different signals sharing the same link.

Gateway node 102 can be any network node configured to interface with other network nodes using various protocols. Gateway node 102 can communicate user data over system 100. Gateway node 102 can be a standalone computing device, computing system, or network component, and can be accessible, for example, by a wired or wireless connection, or through an indirect connection such as through a computer network or communication network. For example, gateway node 102 can include a serving gateway (SGW) and/or a public data network gateway (PGW), etc. One of ordinary skill in the art would recognize that gateway node 102 is not limited to any specific technology architecture, such as Long Term Evolution (LTE) and can be used with any network architecture and/or protocol.

Gateway node 102 can comprise a processor and associated circuitry to execute or direct the execution of computer-readable instructions to obtain information. Gateway node 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 102 can receive instructions and other input at a user interface.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) and can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing information related to elements within system 100, such as presence and location of access node 110 and relay node 130, device capabilities of wireless devices such as wireless device 160, and so on. This information may be requested by or shared with access node 110 via communication links 106, 107, X2 connections, and so on. The software comprises computer programs, firmware, or some other form of machine-readable instructions, and may include an operating system, utilities, drivers, network interfaces, applications, or some other type of software, and combinations thereof. For example, a processing node within controller node 104 can perform the operations described herein. Further, controller node 104 can receive instructions and other input at a user interface.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access node 110 and communication network 101.

Figure 2:
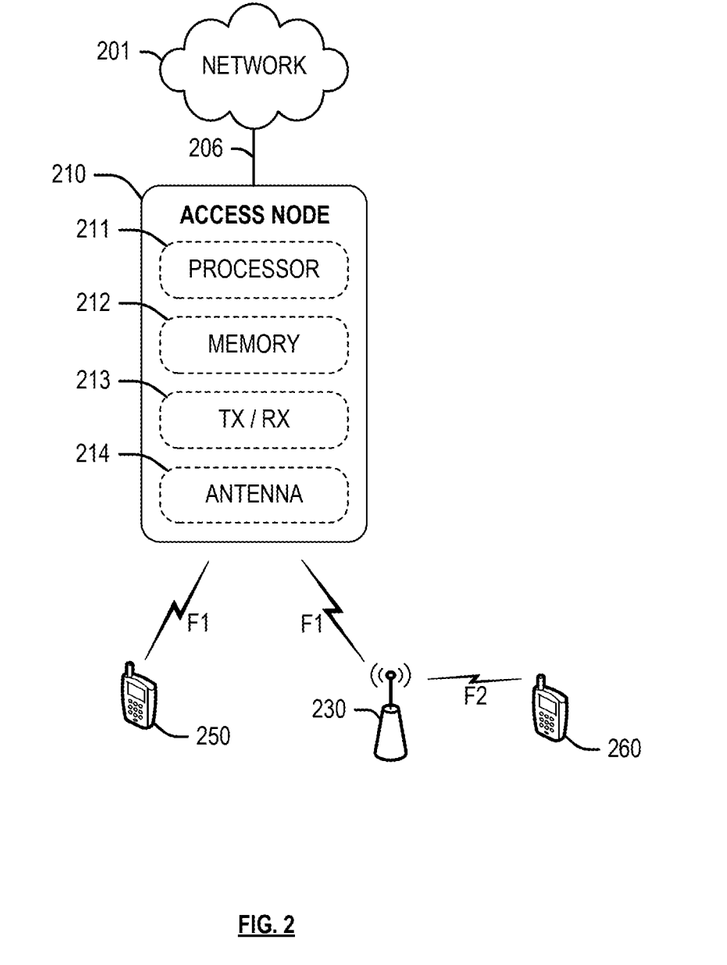
FIG. 2 depicts an exemplary access node.

FIG. 2 depicts an exemplary access node 210. Access node 210 may comprise, for example, a macro-cell access node, such as access node 110 described with reference to FIG. 1. Access node 210 is illustrated as comprising a processor 211, memory 212, transceiver 213, and antenna 214. Processor 211 executes instructions stored on memory 212, while transceiver 213 and antenna 214 enable wireless communication with wireless device 250 and relay node 230. Instructions stored on memory 212 can include deploying a carrier on a first frequency F1 and utilizing a first multiplexing mode such as, for instance, FDD-LTE, enabling wireless device 250 to access network services directly, and relay node 230 to relay data packets to and from wireless device 260. Thus, access node 210 may be referred to as a donor access node. Access node 210 may further be configured to identify relay node 230, and transmit control channel load information to relay node 230, enabling determination of which carrier to be aggregated to communicate with wireless device 260. The load information can include a load level of control channels respectively associated with one or more carriers deployed by access node 210. Such load information is relevant for carrier aggregation, particularly when the carrier deployed by access node 210 is a primary carrier, and the carrier deployed by relay node 230 is a secondary carrier, since the control channel of the primary carrier is utilized to control transmissions for both aggregated carriers. In an exemplary embodiment, access node 210 may be instructed to transmit the load information to relay node 230 periodically. In another exemplary embodiment, access node 210 may be instructed to transmit the load information to relay node 230 in response to receiving a request for said information from relay node 230 (or from any other network node). In either case, based on a load information, a carrier may be identified that has a load level of its associated control channel (i.e. control channel load level) below a threshold load level. The identified carrier may be aggregated with a carrier of the second type (i.e. utilizing frequency F2 and multiplexed with TD-LTE) deployed from the second access node.

Figure 3:
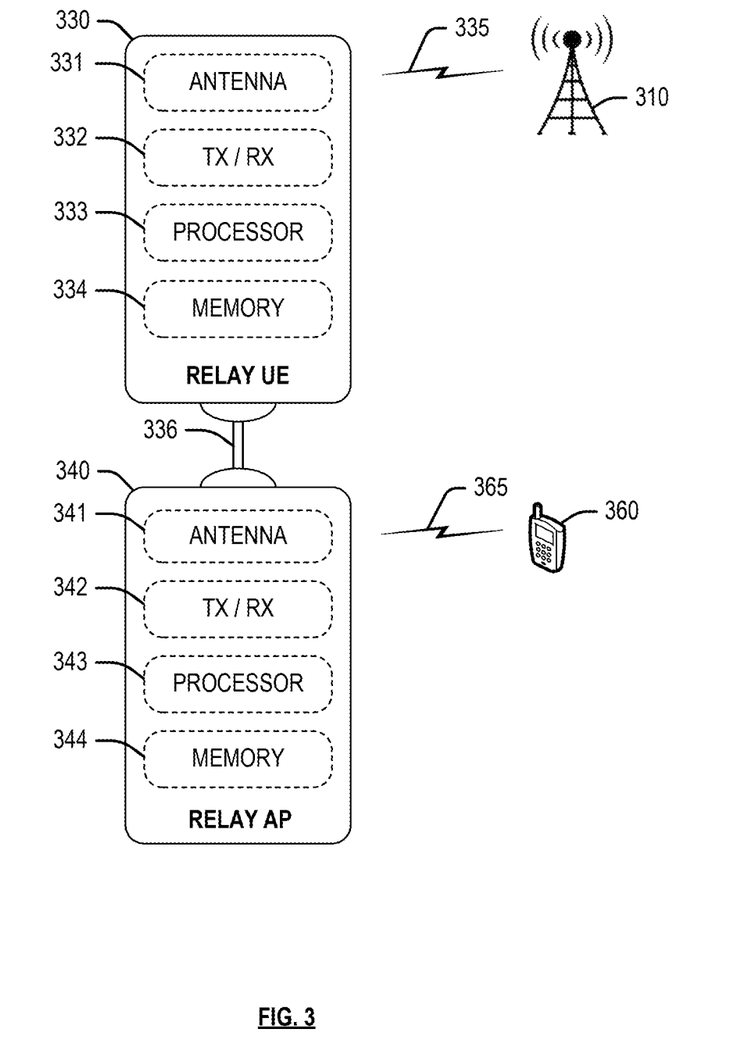
FIG. 3 depicts an exemplary relay node comprising a relay wireless device and a relay access point.

FIG. 3 depicts an exemplary relay node comprising a relay wireless device 330 and a relay access point (AP) 340. Relay wireless device 330 is illustrated as comprising an antenna 331 for direct (i.e. unrelayed) communication with donor access node 310 via wireless backhaul link 335, a transceiver 332, a processor 333, and a memory 334 for storing instructions that enable relay wireless device 330 to perform operations described herein. In some embodiments, relay wireless device 330 is referred to as a customer premise equipment (CPE), which includes any stationary LTE wireless device having a stronger computational & RF capability versus standard wireless devices, as well as a directional antenna and a dedicated power supply, enabling relay wireless device 330 to efficiently provide resources to wireless device 360 via relay access point 340. Consequently, relay access point 340 may be co-located with relay wireless device 330, and is connected to relay wireless device 330 via a communication interface 336. Communication interface 336 may be any interface that enables direct communication between relay wireless device 330 and relay access point 340, such as USB, FireWire, Ethernet, or any other serial, parallel, analog, or digital interface.

In operation, relay wireless device 330 may be configured to relay network services from donor access node 310 to wireless device 360 via relay access point 340. Relay wireless device 330 may begin to function as a relay wireless device by sending a message to donor access node 310 to indicate to donor access node 310 that wireless device 330 is functioning as a relay wireless device. In some embodiments, relay wireless device 330 can request to send a buffer status report to donor access node 310. Donor access node 310 can grant this request in a conventional manner. Relay wireless device 330 may respond to the grant by sending a short buffer status report. This short buffer status report is associated with a logical channel group that indicates the buffer status report is communicating the status of relay wireless device 330 as a relay, and thus is not asking for additional resource allocations (like a 'conventional' buffer status report would indicate). In other words, when relay wireless device 330 responds with a buffer status report for the 'special' logical channel group, it means that the buffer status report is not actually reporting the status of a buffer. Rather, this buffer status report indicates that the wireless device is now functioning as a relay. Once status of relay wireless device 330 is established, relay wireless device 330 may instruct relay access point 340 to start accepting connection requests from one or more wireless devices such as wireless device 360.

Further, based on the indication of relay status, donor access node 310 may alter how relay wireless device 330 is treated. For example, relay wireless device 330 may be provided with preferential treatment because it is functioning as a relay. In an exemplary embodiment, a specific class indicator is assigned to wireless backhaul link 335 between relay wireless device 330 and donor access node 310. The class indicator may be a QCI that is different from other QCIs assigned to wireless devices that are directly connected to donor access node 310. In other embodiments (and as described herein), upon determining that a resource requirement or traffic type of wireless device 360 meets a threshold or other criteria, the class indicator of wireless backhaul link 335 can be adjusted to meet the resource requirement or provide an appropriate QoS for the traffic type.

Relay access point 340 is illustrated as comprising an antenna 341 and transceiver 342 for enabling communication with wireless device 360, processor 343, and a memory 344 for storing instructions that are executed by processor 343. In some embodiments, relay access point 340 may be a home eNodeB. Moreover, although only one transceiver is depicted in each of relay wireless device 330 and relay access point 340, additional transceivers may be incorporated in order to facilitate communication across interface 326 and other network elements. In operation, relay access point 340 may be configured to deploy a carrier by combination of transceiver 341 and antenna 342, and enable carrier aggregation for wireless device 360 based on control channel load information received from access node 310 via relay wireless device 330. For example, memory 344 may include instructions that are executed by processor 343 to perform operations including determining that wireless device 360 is capable of communicating via two or more aggregated carriers (i.e. carrier aggregation), requesting load levels from donor access node 310, and enabling carrier aggregation for wireless device 360 based on the load information. The load information can include a load level of control channels respectively associated with one or more carriers deployed by donor access node 310. Such load information is relevant for carrier aggregation, particularly when the carrier deployed by donor access node 310 is the primary carrier. Thus, instructions in memory 344 further include identifying a carrier that has control channel load level below a threshold load level, aggregate the identified carrier with a carrier deployed by relay access point 340, and instruct wireless device 360 to communicate using the aggregated carriers.

Figure 4:
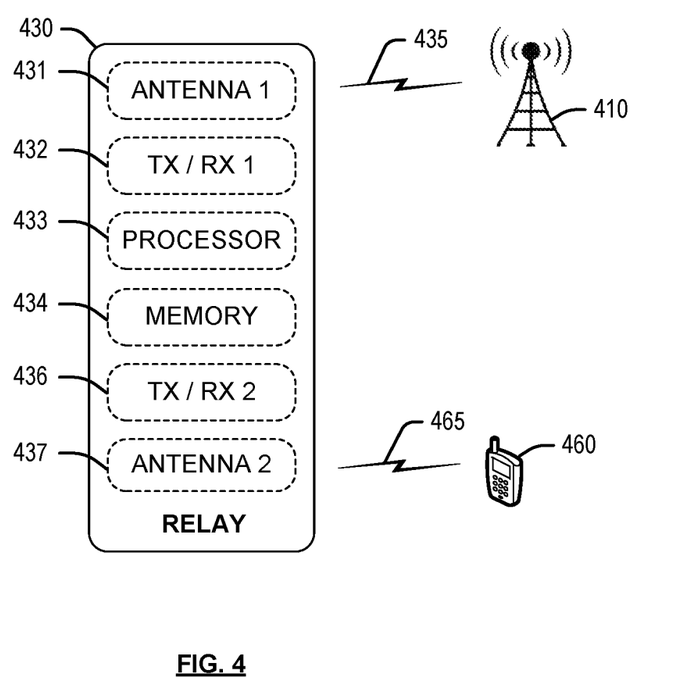
FIG. 4 depicts another exemplary relay node.

In another exemplary embodiment, the relay access node may integrate components of both relay wireless device 330 and relay access point 340 into a single unit. FIG. 4 depicts an exemplary relay node 430 of this type. Relay node 430 is illustrated as comprising an antenna 431 for direct (i.e. unrelayed) communication with donor access node 410 via wireless backhaul link 435, a transceiver 432, a processor 433, and a memory 434 for storing instructions that are executed by processor 422 as described herein. Relay node 430 further includes another transceiver 436 and antenna 437 for enabling communication with wireless device 460. Relay access node 420 can perform operations similar to those described with respect to FIG. 3.

In an embodiment, the relay nodes depicted in FIG. 3-4 can be configured to function as one or more of a layer 1 (L1), layer 2 (L2), or layer 3 (L3) relay. A layer 1 relay functions as a booster or repeater. In other words, a layer 1 relay node performs an amplify and forward (AF) function. RF signals received from a donor access node are amplified and transmitted to end-user wireless devices. Likewise, RF signals received from end-user wireless devices are amplified and transmitted to donor access nodes. Alternatively or in addition, a layer 2 relay node performs a decode and forward (DF) function. RF signals received from a donor access node are demodulated and decoded, then encoded and modulated again before being transmitted to a wireless device. Likewise, RF signals received from a wireless device are demodulated and decoded, then encoded and modulated again before being transmitted to a donor access node. Alternatively or in addition, a layer 3 relay node also performs a decode and forward function. However, a layer 3 relay node also performs additional processing (such as ciphering and/or data concatenation/segmentation/resassembly). In other words, relay node depicted herein performs demodulation and decoding of the received RF signals (either uplink or downlink), processes received data, then encodes, modulates, and transmits the data to a wireless device.

Figure 5:
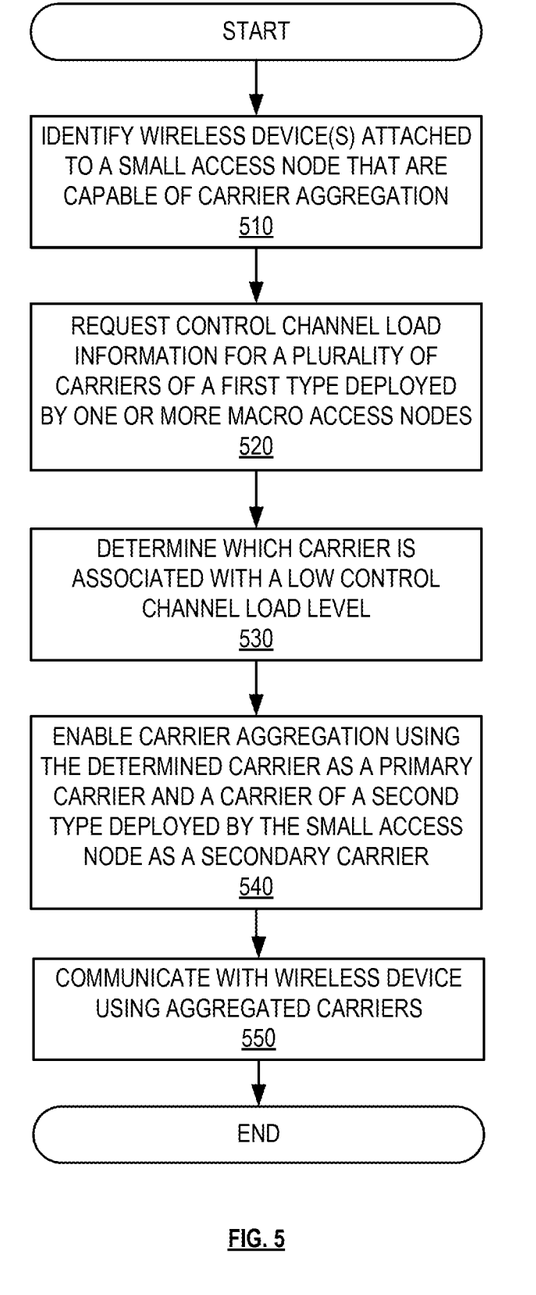
FIG. 5 depicts an exemplary method for performing carrier aggregation based on control channel load levels.

FIG. 5 depicts an exemplary method for performing carrier aggregation based on control channel load levels. The method of FIG. 5 may be implemented by a relay node (such as relay node 130, 330, 430), by a controller node (such as controller node 104), or by any other network node. Although FIG. 5 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 510, one or more wireless devices attached to a small access node and capable of carrier aggregation are identified. The small access node may be any small cell access node, such as a relay node in wireless communication with the macrocell access node, or a home eNodeB in wired communication with the macrocell access node, as described above. Further, the small access node may be in direct communication with the donor access node via a wired link (such as X2) or a wireless link (such as a wireless backhaul). In either case, the donor access node may be configured to deploy one or more carriers of a first type (i.e. utilizing a first duplexing mode), and the second access node may be configured to deploy one or more carriers of a second type (i.e. utilizing a second duplexing mode). For example, carriers of the first type may be deployed by the donor access node using a frequency division duplexing (FDD) mode, and carriers of the second type may be deployed by the small access node using a time division duplexing (TDD) mode.

At 520, control channel load information is requested from one or more macro (i.e. donor) access nodes. The control channel load information can include a load level of control channels respectively associated with one or more carriers of the first type. Such load information is relevant for carrier aggregation, particularly when the carrier of the first type is the primary carrier, and the carrier of the second type is the secondary carrier, since the control channel of the carrier of the first type may be utilized to control transmissions for both aggregated carriers. For example, a control channel load level comprises an indicator of available resources as a percentage of total resources within a control channel associated with the carriers deployed by the donor access node.

At 530, based on the load information, a determination is made of which carrier is associated with a low control channel load level. For example, the relay node may be configured to identify a carrier that has a load level of its associated control channel (i.e. control channel load level) below a threshold load level. In another example, the carrier associated with a control channel having the highest available resources from among the plurality of carriers is selected as a primary carrier for the carrier aggregation. In another embodiment, for two or more carriers that have a relatively similar control channel load level and/or available resources, a carrier with a higher available bandwidth may be selected. In either case, the identified carrier (of the first type, deployed by the donor access node) is aggregated with a carrier of the second type (deployed from the small access node) at 540, used to communicate with the wireless device using the aggregated first and second carriers at 550. Prior to step 550, the wireless device may be instructed to request resources on the primary carrier from the donor access node.

Figure 6:
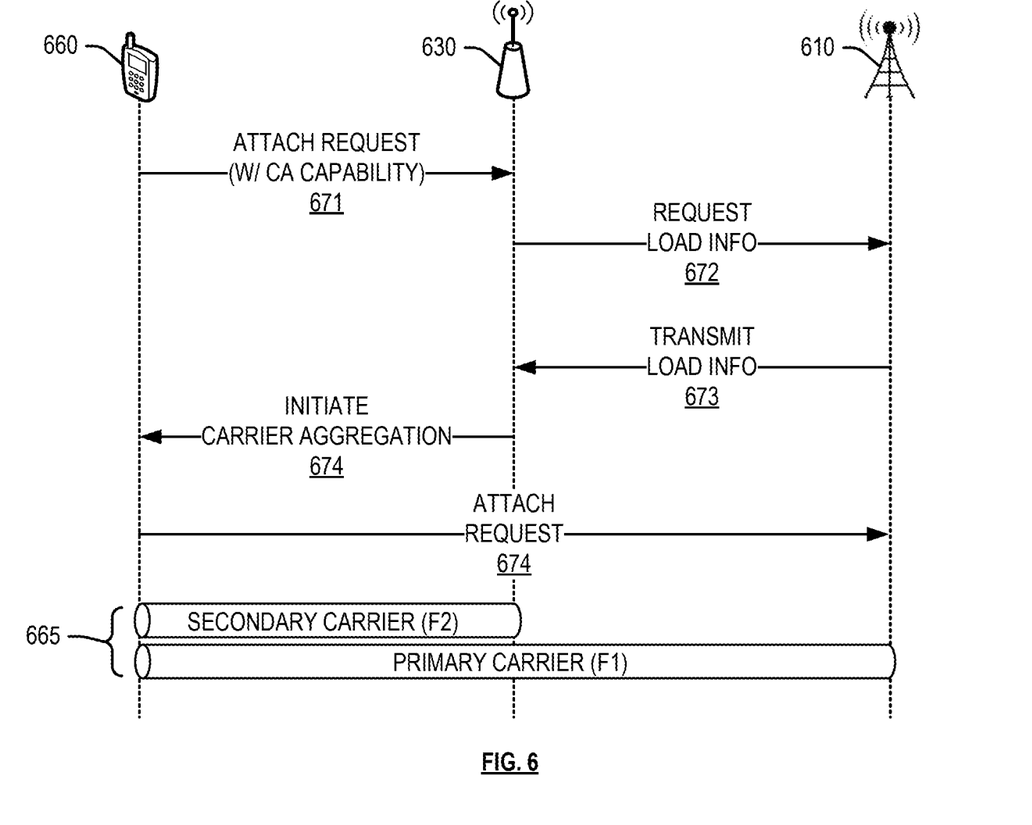
FIG. 6 depicts an exemplary network flow for performing carrier aggregation based on control channel load levels.

FIG. 6 depicts an exemplary network flow for performing carrier aggregation based on control channel load levels. The network flow is described with reference to a donor access node 610, relay access node 630, and wireless device 660. Access node 610 may be considered equivalent to access node 110 in system 100, relay node 630 may be considered equivalent to relay node 130, and wireless device 660 may be considered equivalent to wireless device 130. Other network elements may be present to facilitate communication but are omitted for clarity, such as controllers, gateways, and physical and/or wireless data links for carrying data among the various network elements. Further, although FIG. 6 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

The network flow begins at 671, when a wireless device 660 transmits an attach request to relay node 630. The attach request includes a user equipment (UE) capability information, including a capability of wireless device 660 to communicate using a plurality of aggregated bands, i.e. in a carrier aggregation mode. In other embodiments, the UE capability information may be separately submitted to relay node 630 in response to a capability inquiry from relay node 630. In either case, based on the capability information, relay node 630 can identify or determine that wireless device 660 is capable of carrier aggregation.

At 672, relay node 630 requests control channel load information from donor access node 610. The control channel load information can include a load level of control channels respectively associated with one or more carriers deployed by donor access node 610. Such load information is relevant for carrier aggregation, particularly when a carrier of a specific type deployed by the donor access node is used as the primary carrier. For example, a control channel load level comprises an indicator of available resources as a percentage of total resources within a control channel associated with the carriers deployed by the donor access node. Donor access node 610 may be configured to deploy a plurality of carriers of the specific type (or of different specific types), and the request in 672 includes a request for control load information associated with each of the plurality of carriers.

At 673, the load information is provided from donor access node 610 to relay node 630, upon which a determination is made as to which carrier is associated with a low control channel load level. For example, relay node 630 may be configured to identify a carrier that has a control channel load level below a threshold load level, or a carrier with the lowest control channel load level. In other words, the carrier associated with a control channel having the highest available resources from among the plurality of carriers is selected as a primary carrier for the carrier aggregation. In another embodiment, for two or more carriers that have a relatively similar control channel load level and/or available resources, a carrier with a higher available bandwidth may be selected.

In either case, at 674, an instruction is transmitted to wireless device 660 to initiate carrier aggregation using the identified carrier (of the first type, deployed by donor access node 610) as a primary carrier, and a carrier of the second type (deployed by relay node 630) as a secondary carrier. Thus, at 674, wireless device 660 transmits an attach request to donor access node 610, requesting resources within the identified carrier with the low control channel load level. Eventually, a communication link 665 is set up with a primary carrier (utilizing frequency F1) between wireless device 660 and donor access node 610, and a secondary carrier (utilizing frequency F2) between wireless device 660 and relay node 630. Further, control channel resources associated with the primary carrier are utilized to manage communication link 665.

Figure 7:
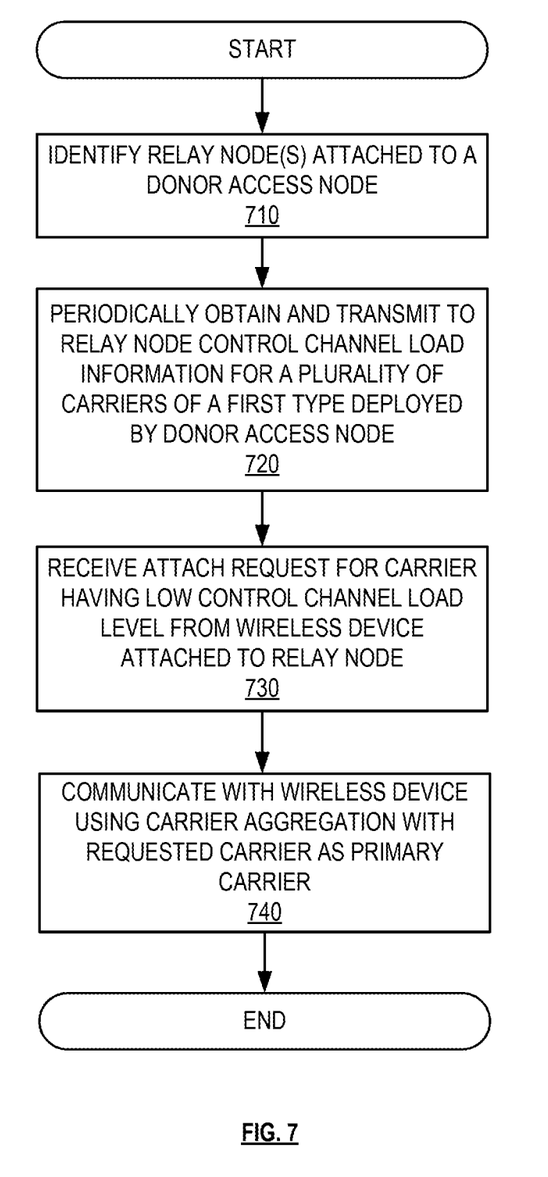
FIG. 7 depicts an exemplary method for performing carrier aggregation based on periodic reporting of control channel load levels.

FIG. 7 depicts an exemplary method for performing carrier aggregation based on periodic reporting of control channel load levels. The method of FIG. 7 may be implemented by a donor access node (such as donor access node 110, 210), by a controller node (such as controller node 104), or by any other network node. Although FIG. 7 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 710, one or more relay nodes attached to a donor access node are identified. The relay node may be any small cell access node in direct communication with the donor access node via a wired link (such as X2) or a wireless link (such as a wireless backhaul), as described above. Moreover, the donor access node may be configured to deploy one or more carriers of a first type (i.e. utilizing a first duplexing mode), and the relay node may be configured to deploy one or more carriers of a second type (i.e. utilizing a second duplexing mode). For example, carriers of the first type may be deployed by the donor access node using a frequency division duplexing (FDD) mode, and carriers of the second type may be deployed by the relay node using a time division duplexing (TDD) mode. The relay node may be identified based on a message transmitted to the donor access node to indicate that the relay node is functioning as a relay. For example, the message can include a short buffer status report that is associated with a special logical channel group, as described above.

Upon identifying a presence of the relay node, the donor access node may be configured at 720 to periodically obtain and transmit control channel load information to the relay node. The control channel load information can include a load level of control channels respectively associated with one or more carriers of the first type. Such load information is relevant for carrier aggregation, particularly when the carrier of the first type is the primary carrier, and the carrier of the second type is the secondary carrier, since the control channel of the carrier of the first type may be utilized to control transmissions for both aggregated carriers. For example, a control channel load level comprises an indicator of available resources as a percentage of total resources within a control channel associated with the carriers deployed by the donor access node. Based on the load information, a determination is made of which carrier is associated with a low control channel load level. For example, the relay node may be configured to identify a carrier that has a control channel load level below a threshold load level, or a lowest control channel load level among a plurality of carriers deployed by the donor access node.

In either case, the relay node instructs wireless devices connected thereto to enable carrier aggregation utilizing the identified carrier (of the first type, deployed by the donor access node) as a primary carrier and a carrier of the second type (deployed by the relay node) as a secondary carrier. Thus, at 730, an attach request is received from the wireless device to communicate with the identified carrier having the low control channel load level. Upon granting/scheduling resources on the identified carrier, at 740, communication is initiated with the wireless device utilizing the aggregated first and second carriers.

Figure 8:
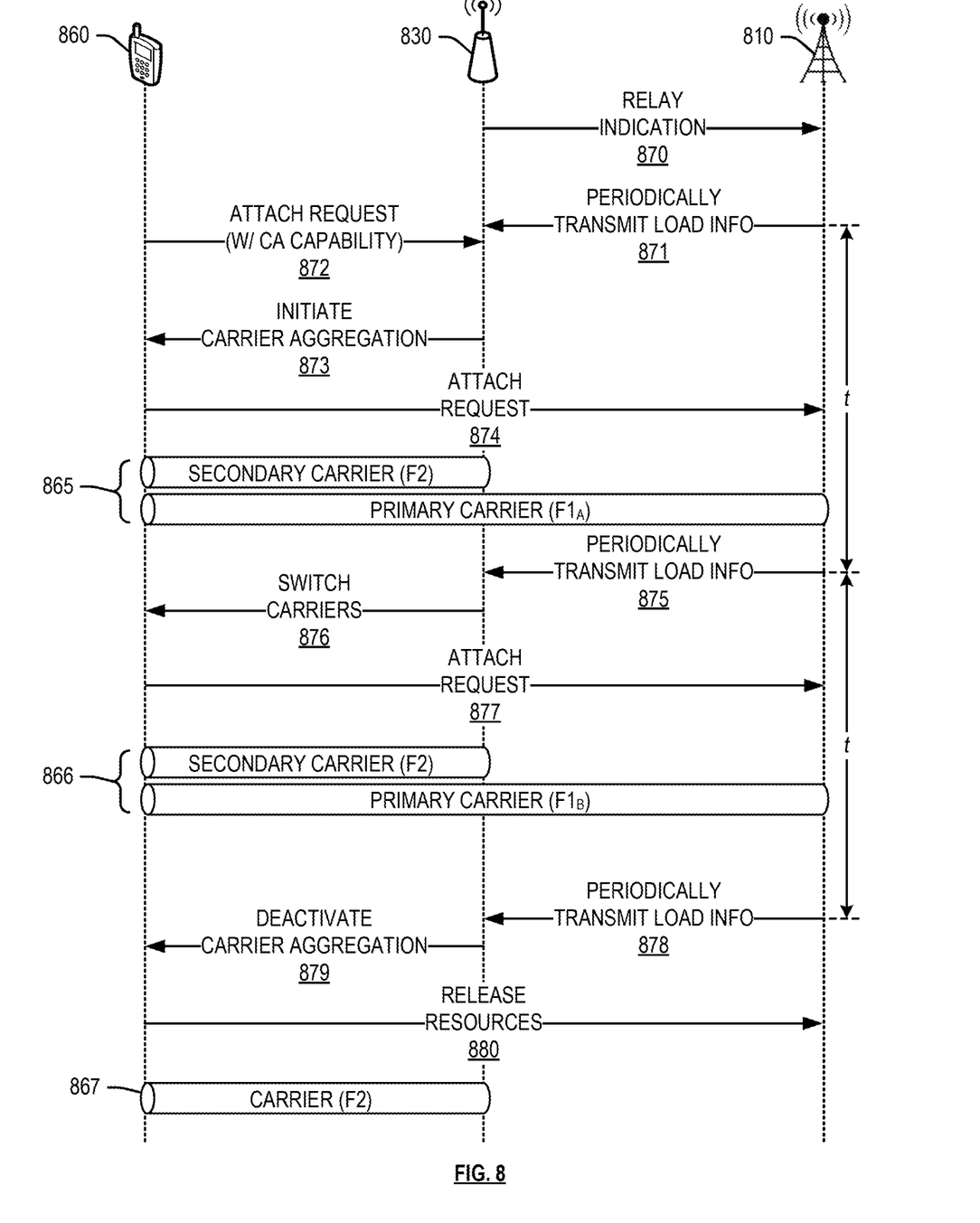
FIG. 8 depicts an exemplary network flow for performing carrier aggregation based on periodic reporting of control channel load levels.

FIG. 8 depicts an exemplary network flow for performing carrier aggregation based on periodic reporting of control channel load levels. The network flow is described with reference to a donor access node 810, relay access node 830, and wireless device 860. Access node 810 may be considered equivalent to access node 110 in system 100, relay node 830 may be considered equivalent to relay node 830, and wireless device 860 may be considered equivalent to wireless device 130. Other network elements may be present to facilitate communication but are omitted for clarity, such as controllers, gateways, and physical and/or wireless data links for carrying data among the various network elements. Further, although FIG. 8 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

The network flow begins at 870, with an indication that relay node 830 is functioning as a relay. This enables donor access node 810 to identify the presence of relay node 830. The indication can include a short buffer status report that is associated with a special logical channel group, as described above. Upon identifying a presence of relay node 830, donor access node 810 may be configured at 871 to periodically obtain and transmit control channel load information to the relay node. The control channel load information can include a load level of control channels respectively associated with one or more carriers deployed by donor access node 810. Such load information is relevant for carrier aggregation, particularly when the carrier deployed by donor access node 810 is the primary carrier. The load information may be transmitted at every time period t as illustrated herein.

At 872, a wireless device 860 transmits an attach request to relay node 830. The attach request includes a user equipment (UE) capability information, including a capability of wireless device 860 to communicate using a plurality of aggregated bands, i.e. in a carrier aggregation mode. In other embodiments, the UE capability information may be separately submitted to relay node 830 in response to a capability inquiry from relay node 830. In either case, based on the capability information, relay node 830 can identify or determine that wireless device 860 is capable of carrier aggregation.

At 873, relay node 830 initiates carrier aggregation for wireless device 860 based on the load information provided from donor access node 810. For example, relay node 830 may be configured to identify a carrier that has a control channel load level below a threshold load level, or a carrier with the lowest control channel load level. In other words, the carrier associated with a control channel having the highest available resources from among the plurality of carriers is selected as a primary carrier for the carrier aggregation. In another embodiment, for two or more carriers that have a relatively similar control channel load level and/or available resources, a carrier with a higher available bandwidth may be selected. Thus, at 873, an instruction is transmitted to wireless device 860 to initiate carrier aggregation using the identified carrier (of the first type, deployed by donor access node 810) as a primary carrier, and a carrier of the second type (deployed by relay node 830) as a secondary carrier. At 874, wireless device 860 transmits an attach request to donor access node 810, requesting resources within the identified carrier with the low control channel load level. A communication link 865 is set up with a primary carrier (labeled F1a) between wireless device 860 and donor access node 810, and a secondary carrier (labeled F2) between wireless device 860 and relay node 830. Further, control channel resources associated with the primary carrier are utilized to manage communication link 865.

At 875, another periodic transmittal of load information is received at relay node 830. In this example, this subsequent load information may indicate that the present primary carrier $F1_A$ now has a control channel that is congested or overloaded. In other words, a control channel load level may be above a threshold. Alternatively, load information received at 875 may indicate that another carrier deployed by donor access node 810 is available, and has more control channel resources than the existing primary carrier $F1_A$. Thus, at 876, relay node 830 instructs wireless device 860 to switch primary carriers to the new carrier, labeled $F1_B$. At 877, wireless device 860 transmits an attach request to donor access node 810, requesting resources within the identified carrier $F1_B$ with the low control channel load level. A communication link 866 is set up with a primary carrier $F1_B$ between wireless device 860 and donor access node 810, and secondary carrier F2 between wireless device 860 and relay node 830. Further, control channel resources associated with the new primary carrier $F1_B$ are utilized to manage communication link 865.

At 878, a third periodic transmittal of load information is received at relay node 830. In this example, this subsequent load information may indicate that the present primary carrier $F1_B$ now has a control channel that is congested or overloaded. Further, the load information may indicate that no carriers are available that have control channel resources. In this situation, at 879, relay node 830 instructs wireless device 860 to deactivate carrier aggregation. Thus, at 880, wireless device 860 transmits a request to release resources of primary carrier $F1_B$, and a communication link 867 remains with only a single carrier F2 between wireless device 860 and relay node 830. In an alternate embodiment, rather than deactivate carrier aggregation, relay node 830 or donor access node 810 may be configured to determine which carrier of a plurality of carriers deployed by donor access node 810 has the lowest control channel load level, and implement that carrier as the primary carrier, without any comparison to threshold load levels.

Figure 9:
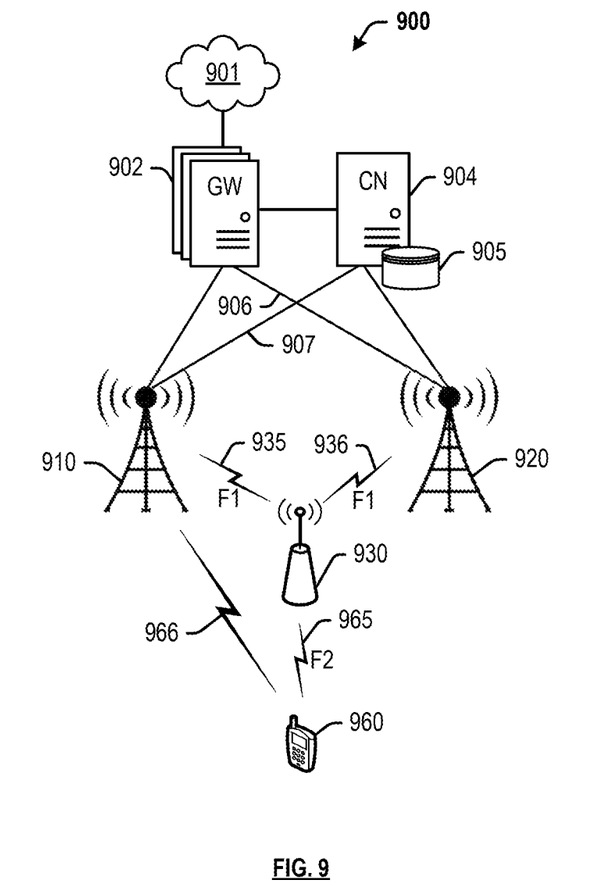
FIG. 9 depicts another exemplary system for performing carrier aggregation based on control channel load levels of a plurality of donor access nodes.

Further, the donor access node may be one among a plurality of macrocell access nodes communicably coupled to the second access node. FIG. 9 depicts another exemplary system 900 for performing carrier aggregation based on control channel load levels of a plurality of donor access nodes. System 900 comprises a communication network 901, gateway 902, controller node 904, access nodes 910 and 920, relay node 930, and end-user wireless device 960. In this exemplary embodiment, access nodes 910 and 920 may be macrocell access nodes configured to deploy one or more carriers utilizing a first frequency F1, and relay node 930 may be configured to deploy one or more carriers utilizing a second frequency F2. Thus, wireless device 960 can communicate with either access node 910 or 920 (hereinafter, "donor access nodes") by attaching to relay node 930 over communication link 965. Further, relay node 930 may be configured to communicate with access nodes 910, 920 over communication links 935, 936 respectively.

Further, each of access nodes 910, 920 may be instructed to transmit load levels of control channels associated the plurality of carriers of the first type deployed therefrom. To enable carrier aggregation for wireless device 960, a carrier with an acceptable load level of its control channel (i.e. with a control channel load level at or below a threshold load level) may be identified from among the plurality of carriers of the first type, and aggregated with the carrier deployed by relay node 930. In other words, the carrier associated with a control channel having the highest available resources from among the plurality of carriers is selected as a primary carrier for the carrier aggregation. In this embodiment, load information received from each of access nodes 910, 920 may indicate that a carrier deployed by access node 910 has a low (i.e. lowest, or lower-than-threshold) control channel load level. Thus, the carrier deployed by access node 910 is set as a primary carrier, and wireless device communicates simultaneously with access node 910 over communication path 966 and with relay node 930 over communication path 965.

The methods, systems, devices, networks, access nodes, and equipment described above may be implemented with, contain, or be executed by one or more computer systems and/or processing nodes. The methods described above may also be stored on a non-transitory computer readable medium. Many of the elements of system 100 may be, comprise, or include computers systems and/or processing nodes. This includes, but is not limited to: access node 110, relay node 120, controller node 104, and/or network 101.

Figure 10:
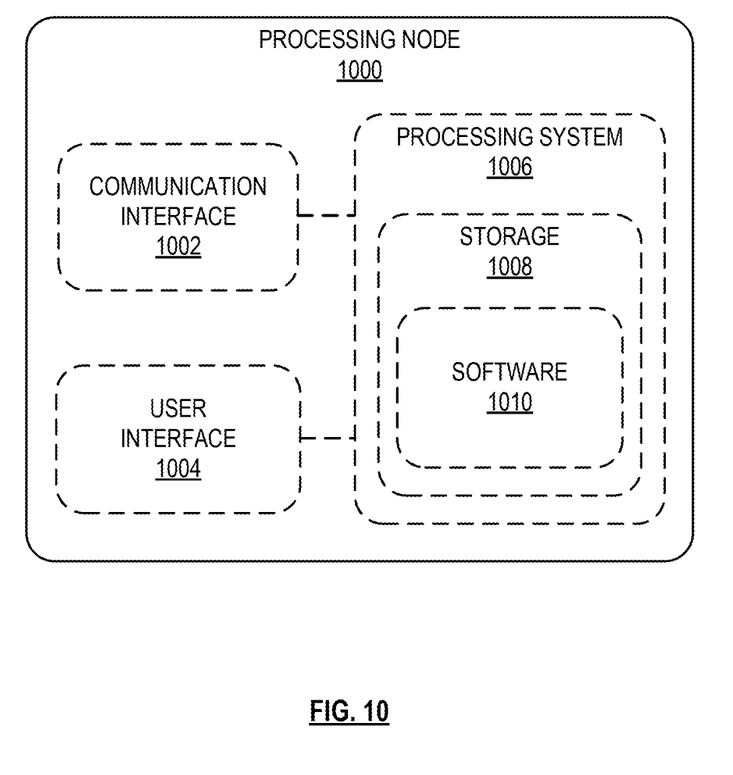
FIG. 10 depicts an exemplary processing node for performing carrier aggregation based on control channel load levels.

FIG. 10 depicts an exemplary processing node for performing carrier aggregation based on control channel load levels. Processing node 1000 comprises a communication interface 1002, user interface 1004, and processing system 1006 in communication with communication interface 1002 and user interface 1004. Processing system 1006 includes storage 1008, which can comprise a disk drive, flash drive, memory circuitry, or other memory device. Storage 1008 can store software 1010 which is used in the operation of the processing node 1000. Storage 1008 may include a disk drive, flash drive, data storage circuitry, or some other memory apparatus. For example, storage 1008 may include a buffer. Software 1010 may include computer programs, firmware, or some other form of machine-readable instructions, including an operating system, utilities, drivers, network interfaces, applications, or some other type of software. For example, software 1010 may include a module for performing transmission power control operations described herein. Processing system 1006 may include a microprocessor and other circuitry to retrieve and execute software 1010 from storage 1008. Processing node 1000 may further include other components such as a power management unit, a control interface unit, etc., which are omitted for clarity. Communication interface 1002 permits processing node 1000 to communicate with other network elements. User interface 1004 permits the configuration and control of the operation of processing node 1000.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A system for performing carrier aggregation in a wireless network, the system comprising:
    a first access node configured to deploy one or more carriers of a first type;
    a second access node communicably coupled to the first access node, the second access node being configured to deploy one or more carriers of a second type; and
    a processing node communicably coupled to both first and second access nodes, the processing node being configured to perform operations comprising:
        identifying a wireless device attached to the second access node that can communicate via two or more aggregated carriers;
        instructing the first access node to:

identify a first carrier from among the one or more carriers of the first type that has a load level of its associated control channel that is below a threshold load level; and transmit, to the second access node, load information of the first carrier, wherein the load information indicates to the second access node that the load level of the associated control channel is below the threshold load level; and instructing the second access node to:
aggregate the first carrier with a second carrier from among the one or more carriers of the second type, and
communicate with the wireless device using the aggregated first and second carriers.

2. The system of claim 1, wherein:
the one or more carriers of the first type comprise frequency division duplex (FDD) carriers, and
the one or more carriers of the second type comprise time division duplex (TDD) carriers.

3. The system of claim 1, wherein:
the first access node comprises a macrocell access node, and
the second access node comprises a small cell access node.

4. The system of claim 3, wherein the small cell access node comprises a relay wireless device coupled to an access point, and is configured to relay data packets between the first access node and an end-user wireless device attached to the access point.

5. The system of claim 4, wherein the first access node transmits the load levels to the small cell access node via a wireless backhaul communication link between the first access node and the relay wireless device.

6. The system of claim 3, wherein the first access node is one among a plurality of macrocell access nodes communicably coupled to the second access node and configured to deploy a plurality of carriers of the first type.

7. The system of claim 6, wherein the processing node is further configured to perform operations comprising:
instructing each of the plurality of macrocell access nodes to transmit load levels of control channels associated with the plurality of carriers of the first type deployed therefrom and having load levels being below the threshold load level; and
instructing the second access node to aggregate, with the second carrier, at least one of the plurality of carriers of the first type.

8. The system of claim 3, wherein the first and second access nodes are communicably coupled via a direct communication link.

9. A method for performing carrier aggregation in a wireless network, the method comprising:
obtaining, at a donor access node, a control channel load level of a first carrier deployed by the donor access node;

determining, at the donor access node, that the control channel load level is within an acceptable load level;

transmitting, by the donor access node, load information of the first carrier to a relay access node communicatively coupled to the donor access node, the load information indicating to the relay access node that the control channel load level is within the acceptable load level; and aggregating, at the relay access node, the first carrier with a second carrier deployed by the relay access node to communicate with a wireless device attached to the relay access node.

10. The method of claim 9, wherein the control channel load level comprises an indicator of available resources as a percentage of total resources within a control channel associated with the first carrier.

11. The method of claim 9, further comprising obtaining, at the relay access node, a plurality of control channel load levels of a corresponding plurality of carriers.

12. The method of claim 11, wherein the plurality of carriers is deployed by the donor access node.

13. The method of claim 11, wherein the plurality of carriers is deployed by a corresponding plurality of potential donor access nodes within range of the relay access node.

14. The method of claim 9, further comprising requesting the donor access node to transmit the control channel load level to the relay access node.

15. The method of claim 14, wherein the requesting is triggered upon determining that the wireless device is capable of communicating using aggregated carriers.

16. A processing node for performing carrier aggregation in a wireless network, the processing node comprising a processor and a memory that are configured to perform operations comprising:
obtaining a load information associated with a plurality of frequency sub-bands deployed by one or more access nodes, wherein the load information indicates an availability of resources within a control channel associated with each of the plurality of frequency sub-bands;
determining that the availability of resources for a first control channel associated with a first frequency sub-band is higher than for any other control channel associated with the plurality of frequency sub-bands; and
transmitting the load information to a second access node in communication with the first access node, wherein the load information indicates to the second access node that the availability of resources for the first control channel is higher than for any other control channel,
wherein the second access node aggregates the first frequency sub-band with a second frequency sub-band deployed by the second access node.

* * * * *